US007354102B2

United States Patent
Cave et al.

(10) Patent No.: US 7,354,102 B2
(45) Date of Patent: Apr. 8, 2008

(54) VEHICLE BODY PANEL WITH INTEGRAL CLIP

(75) Inventors: Alan C. Cave, Mount Forest (CA); Fabian Farkas, Ariss (CA); Ben Zywicki, White Lake, MI (US); Dwight K. Buckle, Guelph (CA); Lawrence G. Landrith, Troy, MI (US); Darrel S. Vassallo, New Haven, MI (US); William S. Kemeny, Ortonville, MI (US)

(73) Assignee: Magna International Inc., Concord, Ontario (CA)

( * ) Notice: Subject to any disclaimer, the term of this patent is extended or adjusted under 35 U.S.C. 154(b) by 64 days.

(21) Appl. No.: 10/569,853

(22) PCT Filed: Aug. 27, 2004

(86) PCT No.: PCT/CA2004/001539

§ 371 (c)(1),
(2), (4) Date: Feb. 27, 2006

(87) PCT Pub. No.: WO2005/021333

PCT Pub. Date: Mar. 10, 2005

(65) Prior Publication Data

US 2006/0267381 A1 Nov. 30, 2006

Related U.S. Application Data

(60) Provisional application No. 60/498,678, filed on Aug. 28, 2003.

(51) Int. Cl.
*B60R 13/02* (2006.01)

(52) U.S. Cl. .................. 296/209; 296/181.2; 296/1.08
(58) Field of Classification Search ............. 296/181.2, 296/209, 29, 35.1, 1.01, 1.08, 901; 293/128, 293/155
See application file for complete search history.

(56) References Cited

U.S. PATENT DOCUMENTS 3,580,628 A 5/1971 Rantala (Continued)

FOREIGN PATENT DOCUMENTS

DE 19718509 4/1998

(Continued)

OTHER PUBLICATIONS

English Abstract of DE 19718509 published Apr. 30, 1998.

(Continued)

*Primary Examiner*—Jason S Morrow
(74) *Attorney, Agent, or Firm*—Clark Hill PLC

(57) ABSTRACT

The invention provides an automotive vehicle plastic panel including a show surface and a hidden surface opposite the show surface. A molded fastener is foldably joined to the plastic panel by a living hinge. The molded fastener, the plastic panel and the living hinge are integrally formed. The molded fastener has a base and a clip member supported on the base. The molded fastener can be fastened to the plastic panel by folding the molded fastener about the living hinge so that the molded fastener engages the hidden surface of the plastic panel in an install position. The clip member is used to fasten the automotive vehicle molding, such as a rocker panel, to a vehicle.

11 Claims, 4 Drawing Sheets

U.S. PATENT DOCUMENTS

| | | |
|---|---|---|
| 4,115,974 A | 9/1978 | Purcell |
| 5,662,375 A | 9/1997 | Adams et al. |
| 6,030,030 A | 2/2000 | Riddle et al. |
| 6,106,055 A * | 8/2000 | Fischer ................. 296/214 |
| 6,220,645 B1 * | 4/2001 | Jacquemin ............ 296/97.12 |
| 6,276,109 B1 * | 8/2001 | Hingorani et al. ........ 52/716.5 |
| 6,431,585 B1 * | 8/2002 | Rickabus et al. ........ 280/728.3 |
| 7,168,757 B2 * | 1/2007 | Futatsuhashi ............. 296/209 |
| 2004/0240932 A1 * | 12/2004 | Benedetti ................. 403/315 |
| 2005/0006917 A1 * | 1/2005 | Sparks et al. ............ 296/1.02 |
| 2005/0082813 A1 * | 4/2005 | Seong ..................... 280/782 |
| 2006/0154023 A1 * | 7/2006 | Maki ....................... 428/122 |
| 2007/0085361 A1 * | 4/2007 | Hauser ..................... 296/1.08 |

FOREIGN PATENT DOCUMENTS

| | | |
|---|---|---|
| DE | 19848871 | 6/1999 |
| DE | 19905547 | 8/2000 |
| EP | 0747283 | 12/1996 |
| EP | 0829383 | 3/1998 |

OTHER PUBLICATIONS

English Abstract of EP 0829383 published Mar. 18, 1998.
English Abstract of DE 19848871 published Jun. 24, 1999.
English Abstract of DE 19905547 published Aug. 31, 2000.
English Abstract of EP 0747283 published Dec. 11, 1996.

* cited by examiner

VEHICLE BODY PANEL WITH INTEGRAL CLIP

CROSS REFERENCE TO RELATED APPLICATIONS

This application claims the benefit of and priority to International Application No. PCT/CA2004/001539, filed Aug. 27, 2004 and entitled "Vehicle Body Panel With Integral Clip", which claims the benefit of and priority to U.S. Provisional Application No. 60/498,678, filed Aug. 28, 2003.

FIELD OF THE INVENTION

The present invention relates to automotive vehicle moldings, and in particular to automotive vehicle plastic panels with an integrally molded fastener.

BACKGROUND OF THE INVENTION

A variety of injection molded parts are made and used for automobile body and trim parts. For example, bumpers, spoilers, body panels, doors, filler panels, side sill garnishes, rocker panels, wheel covers, dashboards, armrests, and other parts are commonly made by injection molding of thermoplastic materials.

These plastic parts often have attachment means on the back or hidden surface in order to affix them to or mount them on an automobile. A common method of attaching plastic parts to automotive vehicles involves providing a plurality of clip housings on the backside of the plastic part. The clip housings are often molded on the backside of the part simultaneously with the molding of the part itself. The clip housings generally provide stand off surfaces to which mounting clips are attached. The plastic part may then be mounted on the automobile by aligning the mounting clips with corresponding holes or openings in the automobile, and pressing the plastic part into position. The mounting clips thereby exert a force to positively retain the plastic part against the automobile. Clip housings often become damaged and cause visible sink marks. Furthermore, such conventional designs result in complicated tooling due to angled lifters to form these clip house features.

Having regard to FIG. 1, a conventional prior art assembled molded fastener is shown using a secondary clip attachment 100, such as a push-in fastener, on an automotive vehicle molding 102. The push-in fastener 100 is mounted on a platform 104. Each push-in fastener 100 includes a lower body 106 having a pair of channels 108', 108" which slidably receive the sides of the slot 110 in the platform 104 and a post-shaped upper body 112 perpendicular to the lower body 106. The lower body 106 further includes a pair of hooks 114', 114" (only hook 114' is shown in FIG. 1) which snap into respective windows 116', 116" in the platform to prevent dislodgment of the push-in fastener from the slot 110. The upper body 112 has a pair of tangs 118', 118". With the push-in fasteners 100 snapped into platform 104, the automotive vehicle molding 102 can be fastened to an automotive vehicle by snapping the upper body 112 of the push-in fastener 100 into respective recesses of the automotive vehicle to install molding 102 thereon.

Such standard designs of using secondary clip attachments on automotive vehicle moldings are relatively costly due to the fact they require separate tooling and assembly equipment in addition to extra labor costs. Furthermore, such prior art fasteners often become damaged and cause visible sink marks.

It is desirable to provide an automotive vehicle plastic panel having an integrally molded fastener.

It is further desirable to provide an automotive vehicle plastic panel with an integrally molded fastener at a reduced cost and with improved strength.

SUMMARY OF THE INVENTION

In accordance with the invention there is provided, an automotive vehicle plastic panel including a show surface and a hidden surface opposite the show surface. The automotive vehicle plastic panel has at least one edge. The automotive vehicle plastic panel comprises a molded fastener foldably joined to the plastic panel by a living hinge along the one edge. The fastener is movable about the living hinge from a molding position to an install position.

In accordance with another aspect of the invention, the molded fastener comprises a base and a clip member supported on the base. The clip member fastens the plastic panel to a vehicle.

In accordance with yet another aspect of the invention, the molded fastener further comprises at least a second and a third edge along the base. The second and third edge each comprises one of a recess and a protrusion.

In accordance with a further aspect of the invention, the plastic panel further comprises complementary recesses or protrusions for receiving the respective recess or protrusion provided at the second and third edges, fastening the molded fastener in an install position on the hidden surface when the molded fastener is rotated about the living hinge.

In accordance with yet a further aspect of the invention, the automotive vehicle plastic panel is a rocker panel.

In accordance with another aspect of the invention, the plastic panel comprises an upper and a lower section. The molded fastener is disposed about the lower section.

Furthermore, in accordance with yet another aspect of the invention, the automotive vehicle plastic panel further comprises a clip housing molded to the hidden surface of the upper section of the plastic panel. The clip housing has a clip for fastening the plastic panel to a vehicle. The clip housing and the plastic panel are integral with each other.

In accordance with a further aspect of the invention, the plastic panel, the molded fastener, and the living hinge are made of thermoplastic polyolefin, thermoplastic olefin, thermoplastic polyurethane, polypropylene, or polyethylene.

In accordance with yet another aspect of the invention, the molded fastener and the clip housing are off-set from each other about a longitudinal extent of the automotive vehicle plastic panel.

In accordance with another aspect of the invention, the automotive vehicle plastic panel further comprises a plurality of molded fasteners and clip housings off-set from each other along the longitudinal extent of the automotive vehicle plastic panel.

Furthermore, in accordance with yet another aspect of the invention, a thickness ratio of the living hinge to the plastic panel and the molded fastener is approximately 1:3.

In accordance with the invention, there is further provided, a rocker panel for an automobile comprising a clip member foldably joined to the rocker panel by a living hinge, wherein the rocker panel, clip member, and living hinge are integrally molded.

BRIEF DESCRIPTION OF THE DRAWINGS

Exemplary embodiments of the invention will now be described in conjunction with the following drawings wherein like numerals represent like elements, and wherein:

FIG. 4b shows a perspective view of the automotive vehicle plastic panel of FIG. 4a;

DETAILED DESCRIPTION OF THE PREFERRED EMBODIMENTS

The present invention provides an automotive vehicle plastic panel with an integrally molded fastener. The molded fastener is integrally molded to the automotive vehicle plastic panel by means of a living hinge design. Such a design avoids the use of secondary clip attachments. Therefore, in accordance with the present invention, the cost for such assemblies can be reduced by reducing the need for extra tooling, assembly equipment, and labor costs that would otherwise be needed when secondary clip attachments are provided.

Automotive vehicle plastic panels in accordance with the present invention may be employed, for example, in rocker panels, rocker molds, side sill garnishes, body panels, bumpers, spoilers, doors, filler panels, wheel covers, dashboards, and armrests. They may also be used to mount other components to a fascia of an automotive vehicle.

The present invention is described in more detail hereinafter having regard to the example of a rocker panel.

Figure 1:
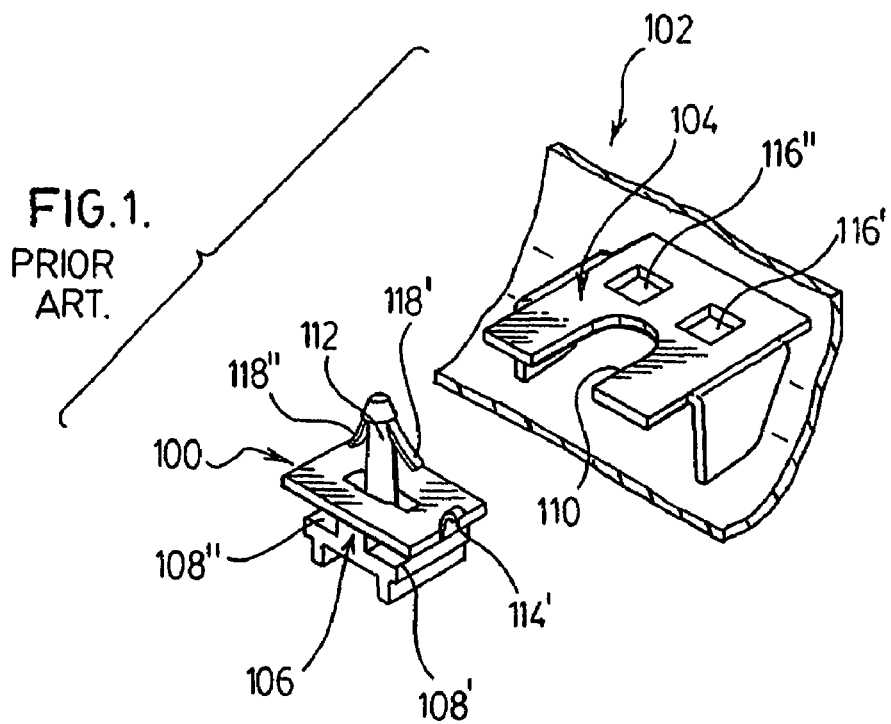
FIG. 1 shows an isometric view of a conventional prior art assembled molded fastener using a secondary clip attachment.
Figure 2:
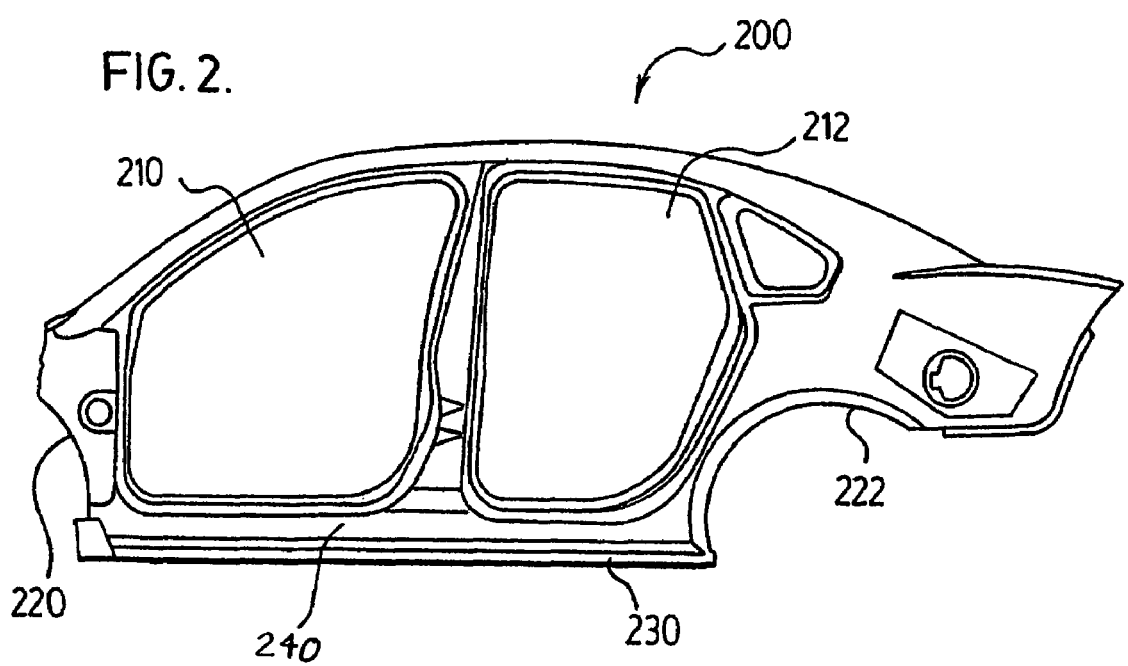
FIG. 2 shows a side view of an automobile body with an automotive vehicle plastic panel in accordance with the invention.

Turning now to FIG. 2, an automobile body 200 is illustrated including a front door opening 210, a rear door opening 212, a front wheel well 220, a rear wheel well 222, and an automotive vehicle plastic panel 230 on a lower side 240 of the automobile body 200. The plastic panel 230, such as a rocker panel, extends longitudinally along the lower side 240 of body 200 below the door openings 210, 212 between the front wheel well 220 and the rear wheel well 222. The plastic panel 230 is fixedly secured to the lower side 240 of the body 200 by means of a plurality of clip connections (not shown). The plastic panel 230, when installed, has a show surface at an outside surface exposed to view and a hidden or mounting surface opposite the show surface facing the body 200 of an automobile, and a longitudinal axis.

Figure 3:
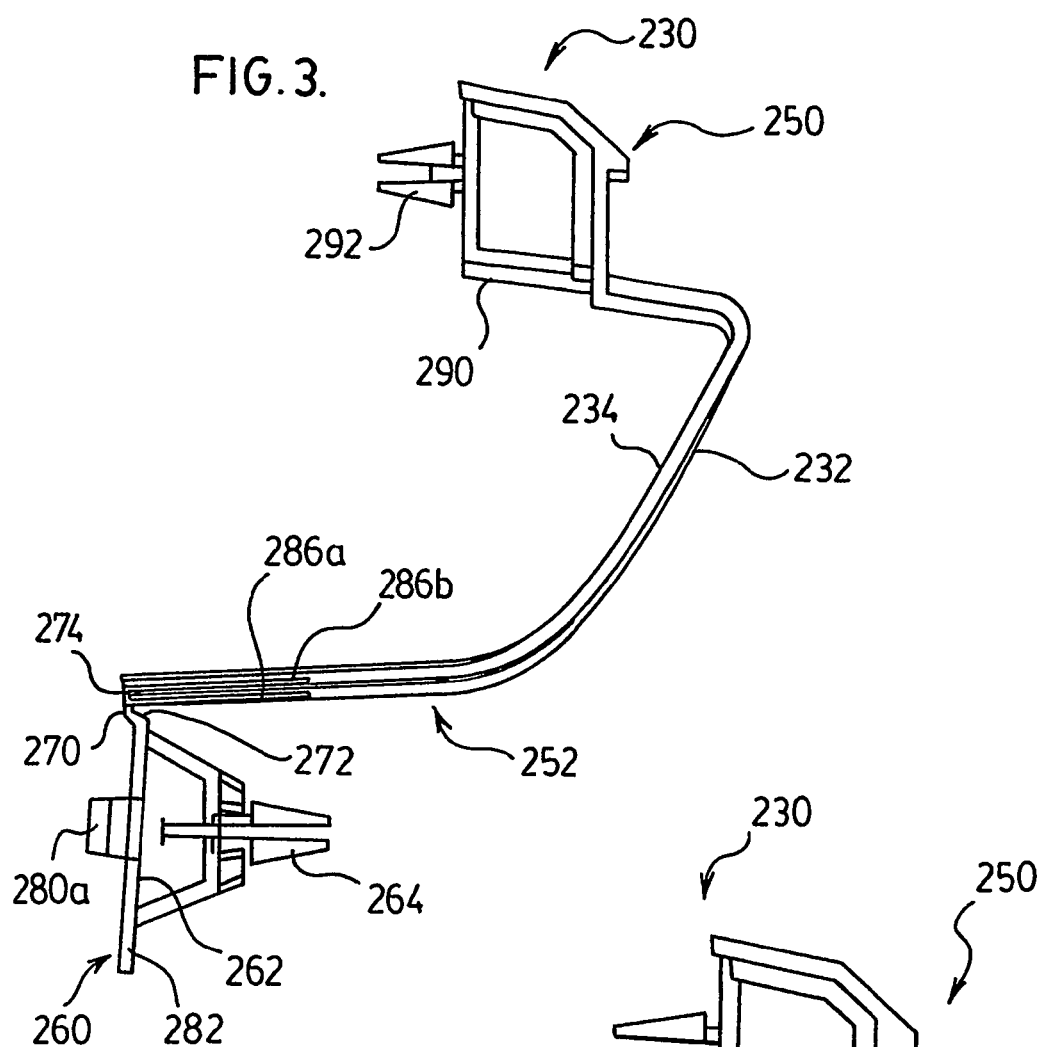
FIG. 3 shows a cross-sectional view of an exemplary automotive vehicle plastic panel in accordance with the invention to illustrate the molded fastener in a more detailed manner.

FIG. 3 shows a cross-sectional side view of such an exemplary plastic panel in accordance with the invention to illustrate the plastic panel in a more detailed manner. The plastic panel 230 includes a show surface 232 and a hidden or mounting surface 234 opposite the show surface 232. Plastic panel 230 is molded from a material that is sufficiently rigid to be used as a rocker panel, for example, but also flexible and bendable at certain thicknesses. Several different materials with these properties are known and may be used, such as, for example, polypropylene, polyethylene, thermoplastic polyolefin, thermoplastic olefin, and thermoplastic polyurethane.

The plastic panel 230 includes an upper section 250 and a lower section 252, and a molded fastener 260 that is foldably joined to the plastic panel 230 by a living hinge 270. Living hinge 270 is positioned along edge 272 of the molded fastener 260 and edge 274 of the plastic panel 230. The molded fastener 260 includes a base 262 and a clip member 264 to allow plastic panel 230 to be fastened to an automotive vehicle when the molded fastener 260 is brought into an install position by rotating the molded fastener 260 about the living hinge 270 to position the molded fastener 260 into contact with a portion of the lower section 252 of panel 230. The living hinge 270 is thin enough to allow itself to flex and bend to allow the molded fastener 260 and the portion of the lower section 252 of panel 230 to contact each other, wherein a thickness of the living hinge 270 determines a stiffness of a hinge action or as necessary for a mold fill. The molded fastener 260 and the panel 230 are molded to be thicker and more rigid than the living hinge 270.

Edge 272 is illustrated as being along the outer perimeter of the molding 230. However, it is now apparent to those skilled in the art that edge 272 could be positioned in any desired location, depending on the fastener requirements.

Figure 4A:
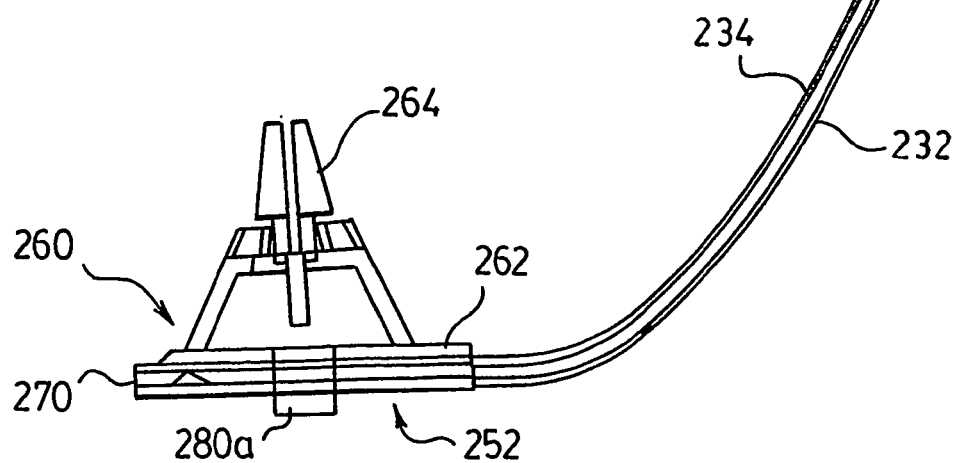
FIG. 4a shows a cross-sectional view of an automotive vehicle plastic panel to illustrate an install position of an integrally molded fastener in more detail.

The molded fastener 260 includes a protrusion 280a and a protrusion 280b along a second edge 282 and a third edge 284, respectively, wherein protrusion 280a and edge 282 are opposite to protrusion 280b and edge 284. The lower section 252 of plastic panel 230 has complementary recesses 286a and 286b so that respective protrusions 280a, 280b of the molded fastener 260 can snap in place and secondarily fasten the molded fastener 260 in an install position on the hidden surface 234 when the molded fastener 260 is folded about the living hinge 270. Alternatively, protrusions are provided on the panel 230 and the molded fastener 260 has complementary recesses to fasten the molded fastener 260 to the panel 230 in an install position. FIG. 4a, a cross-sectional side view of plastic panel 230, and FIG. 4b, a perspective view of plastic panel 230, show this install position in more detail.

The living hinge design of molding 230 allows the molded fastener 260 and the plastic panel 230 to be integrally molded with the living hinge 270. The fastener 260 can be positioned in a molding position so that the longitudinal extent of the fastener 260 is aligned with the die draw of the molds utilized to mold the plastic panel 230. From a tooling point of view it would be difficult to mold a fastener in the install position. Rotating the fastener 260 so that it extends in the direction of the draw dramatically reduces the complexity of the mold so that additional assembly equipment and/or tooling for a separate fastener can be obviated. This provides for assembly cost savings of such moldings.

Figure 4B:
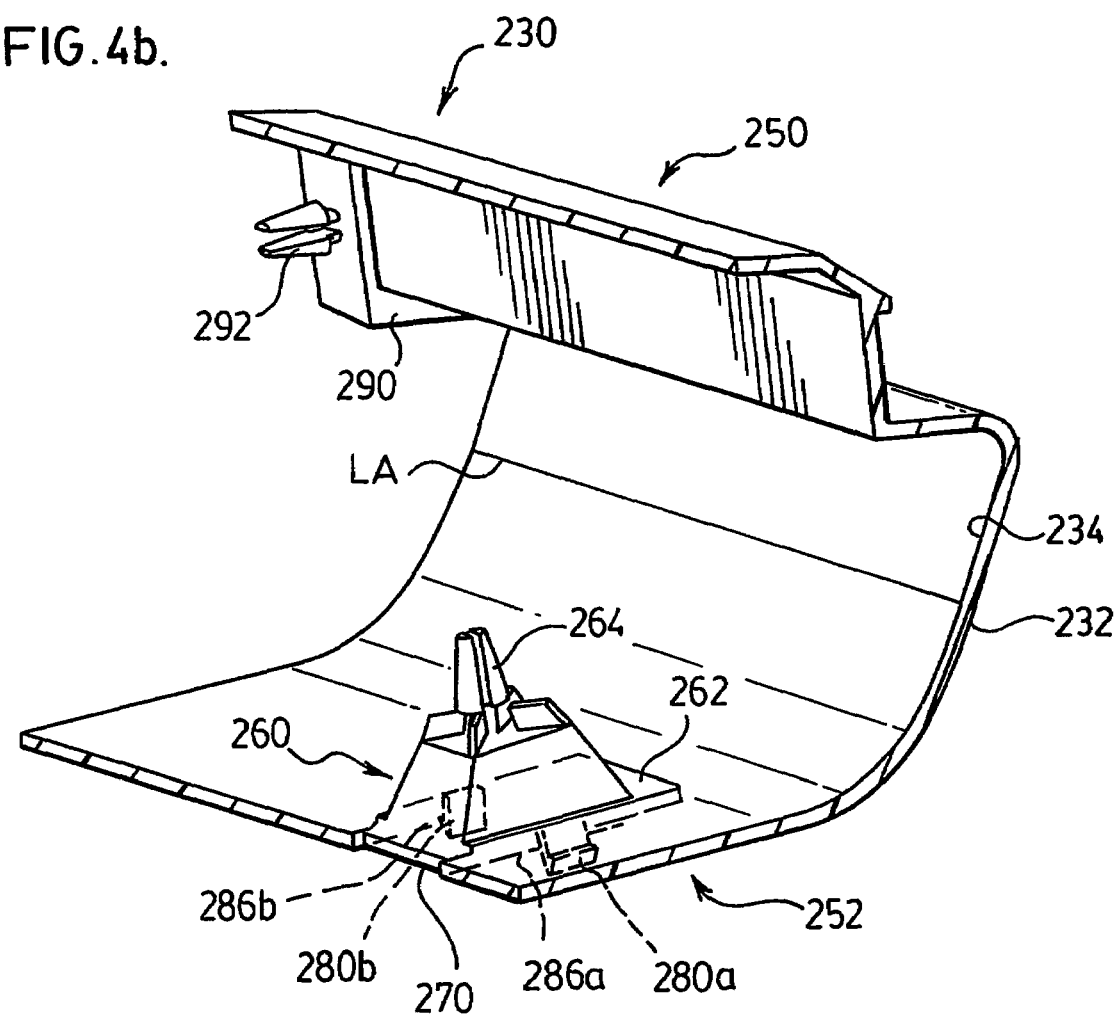

In accordance with a further embodiment of the invention and as can be seen from FIGS. 3, 4a and 4b, plastic panel 230 includes a clip housing 290 having a clip 292 in the upper section 250 of plastic panel 230. The clip housing 290 and clip 292 are integrally molded with plastic panel 230. Clip 292 is also used to fasten the plastic panel 230 to a vehicle.

In accordance with yet another embodiment of the invention, molded fastener 260 and clip housing 290 are off-set from each other about a longitudinal axis LA of plastic panel 230, as can be seen from FIG. 4b.

Figure 5:
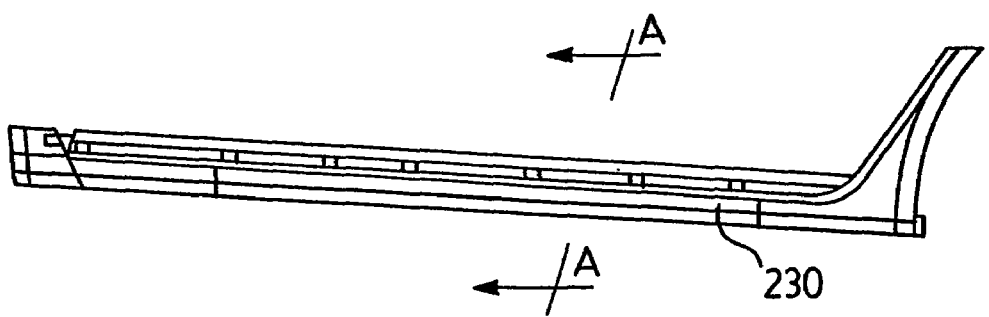
FIG. 5 shows a side view of an automotive vehicle molding after being mounted on a body of an automotive vehicle.

FIG. 5 shows a side view of the plastic panel 230 after being installed or mounted to body 200 of an automotive vehicle.

Figure 6:
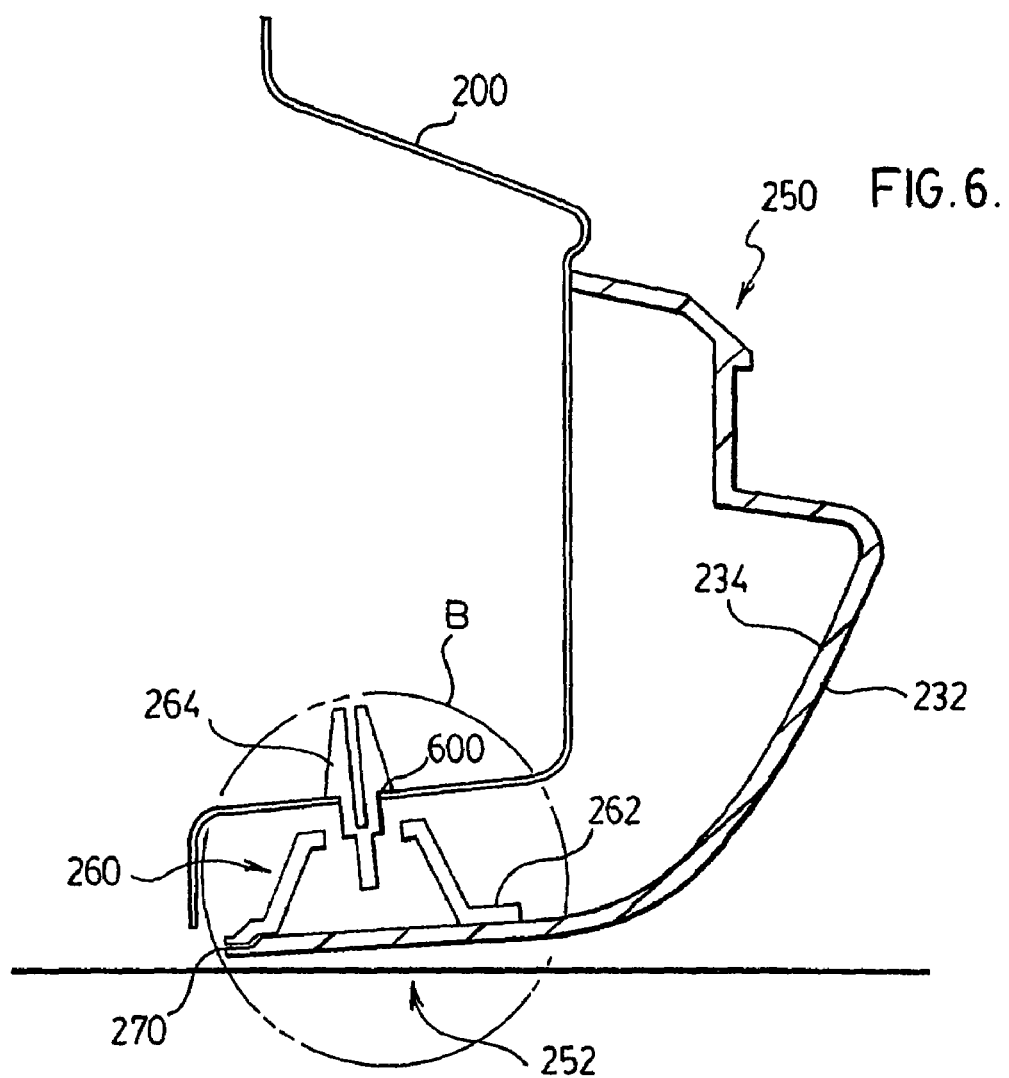
FIG. 6 shows a cross-sectional view along line A-A of FIG. 5.

FIG. 6 shows a cross-sectional view along line A-A of FIG. 5 of the installed/mounted plastic panel 230 to show more clearly how clip member 264 of the molded fastener 260 is mounted to body 200 of an automotive vehicle by snapping in place with a complementary recess 600 of body 200.

Figure 7:
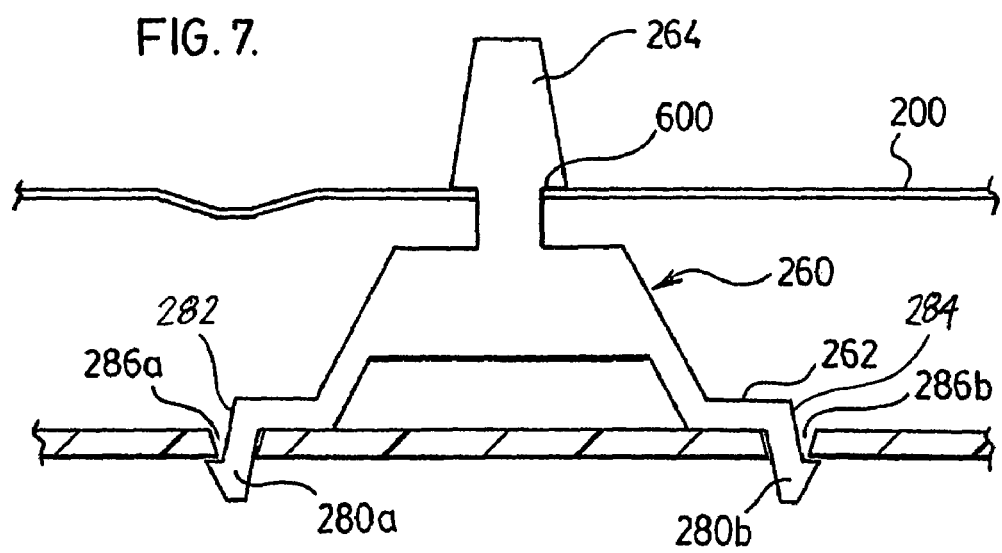
FIG. 7 presents a close-up cross-sectional view of section B of FIG. 6.

FIG. 7 presents a close-up cross-sectional view of section B of FIG. 6 showing protrusions 280a and 280b of the molded fastener 260 and complementary recesses 286a and 286b of the plastic panel 230. Clip member 264 is snapped into recess 600 of body 200.

In order to install plastic panel 230 on an automotive vehicle, a plurality of molded fasteners 260 and clip housings 290 are provided off-set from each other along longitudinal axis LA of plastic panel 230.

In general, a living hinge is a thin portion of a plastic material that bridges two thicker walls of a plastic material and that provides the ability to flex repeatedly without the use of a mechanical hinge. A living hinge made from polyethylene or polypropylene can flex several cycles without failure. However, in accordance with the present invention, the living hinge needs to be folded only a few cycles to bring the molded fastener into the install position. Hence other plastic materials with a lower flexibility than polyethylene or polypropylene can be used in accordance with the present invention.

In accordance with another embodiment of the invention, the living hinge portion of the plastic material and the two thicker walls of the plastic material bordering the living hinge have a thickness ratio of about 1:3. In accordance with a further embodiment of the invention, the living hinge has a thickness of about 1 mm±0.25 mm.

The above described embodiments of the invention are intended to be examples of the present invention and numerous modifications, variations, and adaptations may be made to the particular embodiments of the invention without departing from the spirit and scope of the invention, which is defined in the claims.

What is claimed is:

1. A plastic panel for mounting on a vehicle, said plastic panel comprising:
    an upper section and a lower section;
    an integrally molded fastener being disposed on an edge of said lower section, said fastener being movable about a living hinge from a molding position to an install position, wherein said fastener secondarily attaches to said plastic panel after said fastener is rotated about said living hinge to retain said fastener in said install position for fastening said plastic panel to the vehicle; and
    a clip housing integrally molded to a hidden surface of said upper section, said clip housing having a clip for fastening said plastic panel to the vehicle.

2. The plastic panel as defined in claim 1 wherein the fastener comprises a base and a clip member supported on the base, said clip member configured for fastening the plastic panel to the vehicle.

3. The plastic panel as defined in claim 2 wherein the fastener further comprises at least one of a recess and a protrusion for said secondary attachment.

4. The plastic panel as defined in claim 2 wherein the fastener further comprises at least two of a recess and a protrusion for said secondary attachment.

5. The plastic panel as defined in claim 2 wherein said plastic panel further comprises a recess or protrusion for receiving a complementary protrusion or recess, fastening said fastener in the install position on the hidden surface when said fastener is rotated about the living hinge.

6. The plastic panel as defined in claim 2 wherein said plastic panel further comprises recesses or protrusions for receiving the complementary protrusions or recesses spaced about said base of said fastener retaining said fastener in the install position on the hidden surface when said fastener is rotated about the living hinge.

7. The plastic panel as defined in claim 1 wherein the plastic panel is a rocker panel.

8. The plastic panel as defined in claim 1 wherein the plastic panel, the fastener, and the living hinge are molded of thermoplastic polyolefin, thermoplastic olefin, thermoplastic polyurethane, polypropylene, or polyethylene.

9. The plastic panel as defined in claim 1 further comprising a plurality of integrally molded fasteners and clip housings off-set from each other along a longitudinal extent of the plastic panel.

10. The plastic panel as defined in claim 1 wherein a thickness ratio of the living hinge to the plastic panel and the fastener is approximately 1 to 3.

11. A plastic panel for mounting on a vehicle, said plastic panel comprising:
    an upper section and a lower section;
    an integrally molded fastener being disposed on an edge of said lower section, said fastener being movable about a living hinge from a molding position to an install position, wherein said fastener secondarily attaches to said plastic panel after said fastener is rotated about said living hinge to retain said fastener in said install position for fastening said plastic panel to the vehicle; and
    a clip housing integrally molded to a hidden surface of said upper section, said clip housing having a clip for fastening said plastic panel to the vehicle;
    said fastener and said clip housing off-set from each another about a longitudinal extent of the plastic panel.

* * * * *